No. 749,838. PATENTED JAN. 19, 1904.
H. M. BURDICK.
CORN HARVESTER.
APPLICATION FILED FEB. 17, 1903.
NO MODEL. 2 SHEETS—SHEET 1.

WITNESSES
Rich. A. George
S. A. Brown

INVENTOR
HIRAM M. BURDICK
By Milton E. Robinson
ATTORNEY

No. 749,838. PATENTED JAN. 19, 1904.
H. M. BURDICK.
CORN HARVESTER.
APPLICATION FILED FEB. 17, 1903.
NO MODEL. 2 SHEETS—SHEET 2.

WITNESSES
Rich. A. George
S. A. Brown

INVENTOR
HIRAM M. BURDICK
By Milton E Robinson
ATTORNEY

No. 749,838. Patented January 19, 1904.

UNITED STATES PATENT OFFICE.

HIRAM M. BURDICK, OF UTICA, NEW YORK, ASSIGNOR TO STANDARD HARROW COMPANY OF UTICA, NEW YORK.

CORN-HARVESTER.

SPECIFICATION forming part of Letters Patent No. 749,838, dated January 19, 1904.

Application filed February 17, 1903. Serial No. 143,794. (No model.)

*To all whom it may concern:*

Be it known that I, HIRAM M. BURDICK, of Utica, in the county of Oneida and State of New York, have invented certain new and useful Improvements in Corn-Harvesters; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an improvement in guards for the knives of corn-harvesters and in the mechanism for locking the guard in extended position and for releasing and operating the guard.

Figure 1:
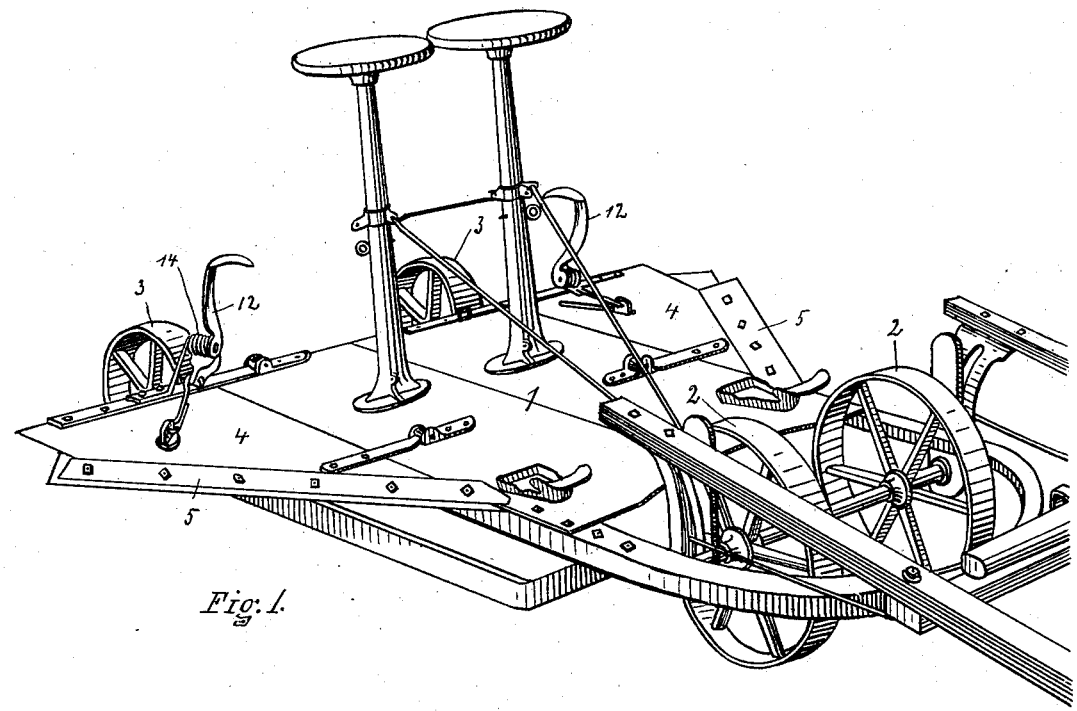
Figure 2:
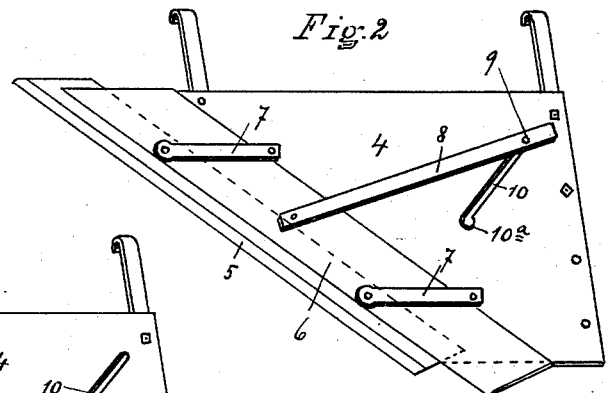
Figure 3:
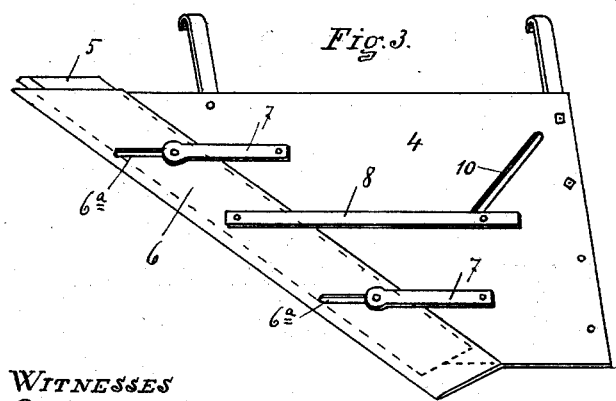
Figure 4:
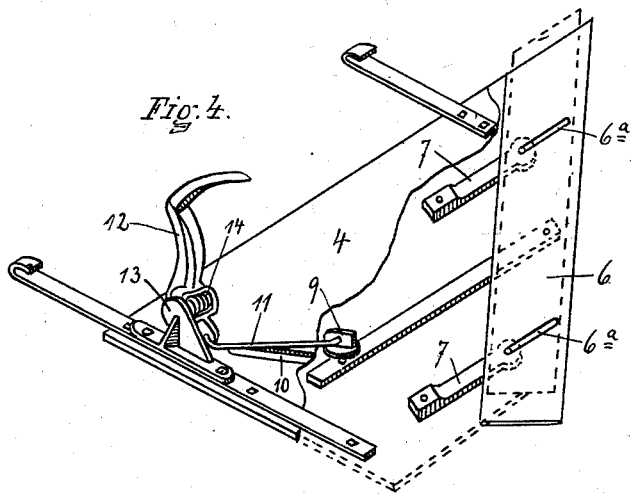
Figure 5:
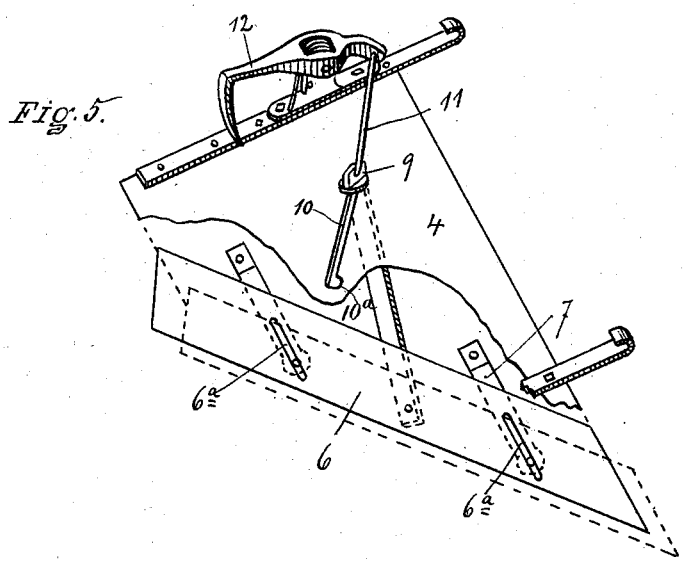

In the drawings, Figure 1 shows a perspective view of a corn-harvester including the feature of my invention. Fig. 2 shows a bottom view of one of the wings of the corn-harvester with the guard in a retracted position. Fig. 3 shows the same with the guard in extended position. Fig. 4 is a perspective view from the top as to part of the wing with the mechanism mounted thereon, and as to a part the wing is shown broken away, showing the mechanism located immediately under the wing. Fig. 5 is a perspective view from a different point of view of substantially the same parts, with the guard, however, in retracted position.

Referring to the reference-figures in a more particular description, 1 indicates the body of a corn-harvester, which is mounted on wheels 2 2 at its forward end and 3 3 at its rear end. The harvester is provided with a pair of folding wings 4 4, on either side hinged to the body and adapted to fold into a vertical position. The upper edge of the wing 4 is formed on an incline or at an acute angle with the side of the body and is provided on this edge with a fixed cutting-knife 5. Under the knife there is provided the movable knife-guard 6, which knife-guard is provided with a pair of slotted openings $6^a$ $6^a$, and the guard is secured to the wing by means of keepers 7 7, one end having its arm passing through slots $6^a$. To the middle portion of the guard there is attached the forward end of a connecting rod or link 8. The rear end of the rod or link 8 is provided with a stud or projection 9, a portion of which passes through the slotted opening 10 in the wing and on the upper side is provided with a head adapted to receive one end of the treadle-link 11. The slot 10 is provided at its forward end with an offset $10^a$, affording a shoulder against which the stud or projection 9 is adapted to lock to secure the guard in extended position. A foot-treadle lever 12 is pivoted in a bracket 13, mounted on the wing close to the inner edge at the rear end and in a convenient position to be reached by the foot of the operator sitting on one of the seats provided on the machine.

14 indicates a spring provided at the pivot of the foot-lever 12 and tensioned to move the projection 9 toward the forward or outer end of the slot 10 and extend the guard.

The knives 5 of this class of machine are dangerous, and it becomes desirable to protect them as far as possible and to immediately securely guard the cutting edge of the knife in case of any mishap or accident in the operation of machine. It will of course be understood that this machine operates by drawing it forward and in such a manner as to bring the cutting-knife against the standing stalk of corn, and in so doing severs the stalks, which are gathered in the arms of the operator sitting on the seat, until a convenient bundle is gathered, when they are laid off and the gathering of the succeeding bundle is commenced.

The machine, as shown, is adapted to be operated by two persons, excluding the driver. One of these persons looks after one side of the machine, while the other operator looks after the other side. While in operation each operator maintains one of his feet on the treadle-lever 12, and thereby unlocks the rear end of the connecting-rod 8 from the shoulder $10^a$ and draws back the guard, allowing the knife to be exposed and in condition to operate. In case of any mishap or accident or the discontinuance of the work the lever 12 is released by the operator, and under the action of the spring 14 the guard is at once forced out, and it becomes securely locked against force applied to the edge of the guard by the stud or projection 9 becoming engaged at the shoulder at the forward end of the slot 10.

What I claim as new, and desire to secure by Letters Patent, is—

1. A combination with a corn-harvester of a wing, having a fixed knife and a slotted opening with an offset at one end, a knife-guard and operating mechanism, consisting of a link connected to the guard with a stud or shoulder running in said slot and adapted to become engaged on the offset thereof, and a treadle adapted to throw the stud out of engagement with the shoulder and operating the guard to folded position, substantially as set forth.

2. The combination in a corn-harvester, of a wing hinged or pivoted to the body of the machine, having a fixed knife and a slotted opening with an offset at one end, a knife-guard and operating mechanism consisting of a link connected at one end of the guard and having a shoulder or stud on the other end of the link running in said slot, a treadle mounted on the guard adjacent to the machine and connected with said stud or projection, and a spring for throwing the guard into extended position, substantially as set forth.

3. The combination with a corn-harvester, of a wing pivoted to the harvester, having a fixed knife arranged at an angle on the forward edge of said wing, and having a slotted opening with the offset at one end, a knife-guard mounted on said wing and operating mechanism, consisting of a link connected to the guard, with a shoulder or stud running in said slot and adapted to become engaged with the offset in the slot, a treadle mounted on the guard and a spring operating to extend the guard, and cause the shoulder on the link to lock with the offset in the slot, substantially as set forth.

In witness whereof I have affixed my signature, in presence of two witnesses, this 13th day of February, 1903.

HIRAM M. BURDICK.

Witnesses:
E. WILLARD JONES,
S. A. BROWN.